United States Patent [19]

Ando

[11] Patent Number: 4,517,666
[45] Date of Patent: May 14, 1985

[54] OPTICAL HEAD

[75] Inventor: Hideo Andō, Tokyo, Japan

[73] Assignee: Tokyo Shibaura Denki Kabushiki Kaisha, Kawasaki, Japan

[21] Appl. No.: 390,775

[22] Filed: Jun. 21, 1982

[30] Foreign Application Priority Data

| Jun. 22, 1981 [JP] | Japan | 56-96198 |
| Sep. 17, 1981 [JP] | Japan | 56-146541 |
| Sep. 17, 1981 [JP] | Japan | 56-146544 |
| Sep. 17, 1981 [JP] | Japan | 56-146545 |
| Oct. 22, 1981 [JP] | Japan | 56-168963 |

[51] Int. Cl.$^3$ .............................................. G11B 7/00
[52] U.S. Cl. ...................................... 369/45; 369/118
[58] Field of Search .................... 250/201; 369/45, 46, 369/118, 111

[56] References Cited

U.S. PATENT DOCUMENTS

| 3,876,841 | 4/1975 | Kramer et al. | 369/45 |
| 3,969,575 | 7/1976 | Gerritsen et al. | 369/45 |
| 4,059,841 | 11/1977 | Bricot et al. | 369/45 |
| 4,079,248 | 3/1978 | Lehureau et al. | |
| 4,110,607 | 8/1978 | Honjo et al. | 369/111 X |
| 4,357,533 | 11/1982 | Winslow | 369/45 X |
| 4,390,781 | 7/1983 | Musha | 369/45 X |

FOREIGN PATENT DOCUMENTS 52-42742 4/1977 Japan.
56-133704 10/1981 Japan.

Primary Examiner—Donald McElheny, Jr.
Attorney, Agent, or Firm—Cushman, Darby & Cushman

[57] ABSTRACT

The invention provides an optical head having an objective lens whose optical axis is perpendicular to a light-reflecting layer of an optical disk. Parallel laser beams are incident on the objective lens and are focused on the light-reflecting layer. The laser beams reflected by the light-reflecting layer are transferred to a projection lens through the objective lens, and are projected on a light-receiving surface of a photodetector. An image of a beam waist of the laser beams converged by the objective lens is formed on the light-receiving surface through the objective and projection lenses. A light-shielding plate with an aperture is arranged between the projection lens and the objective lens. Only part of the laser beams which passes through an area spaced apart from a common axis of the objective and projection lenses is transmitted through its aperture. A projected pattern is moved on the light-receiving surface, depending upon a distance between the objective lens and the light-reflecting layer. The light-receiving surface has first and second photosensitive regions arranged in a direction along which the projected pattern is moved.

17 Claims, 25 Drawing Figures

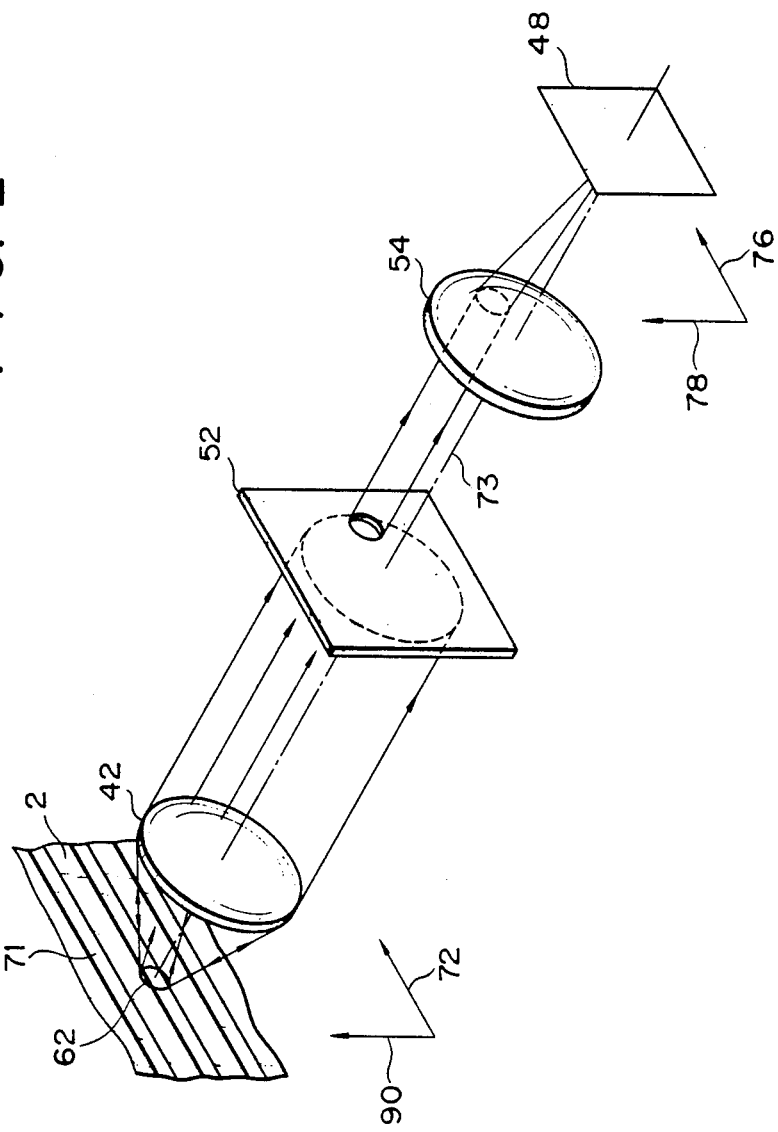

F I G. 3A
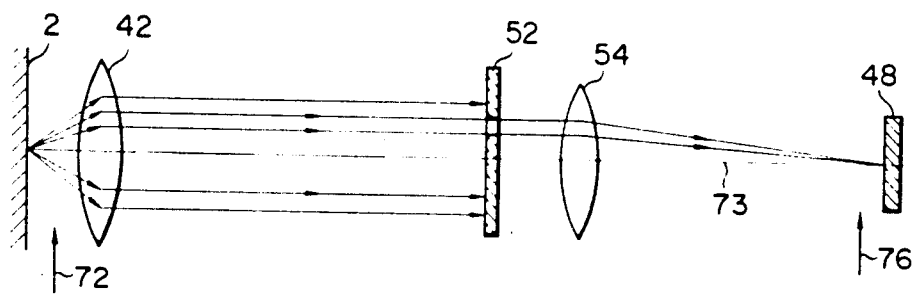
F I G. 3B
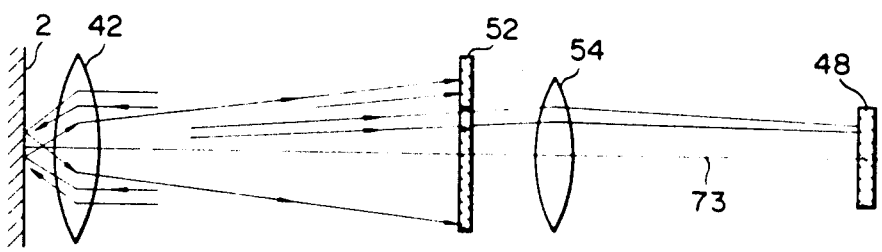
F I G. 3C
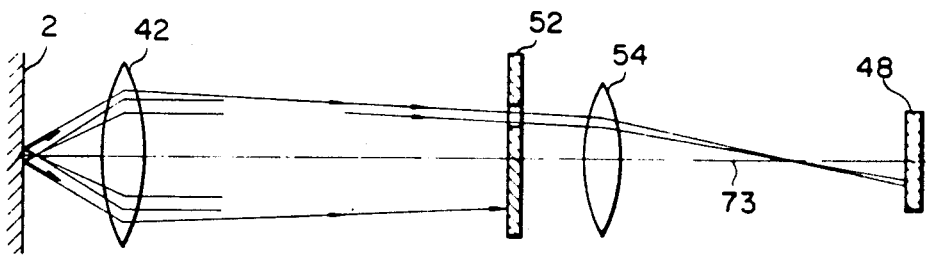

F I G. 8 D
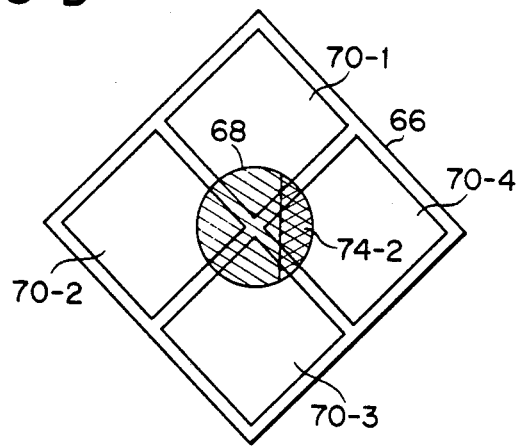
F I G. 8 E
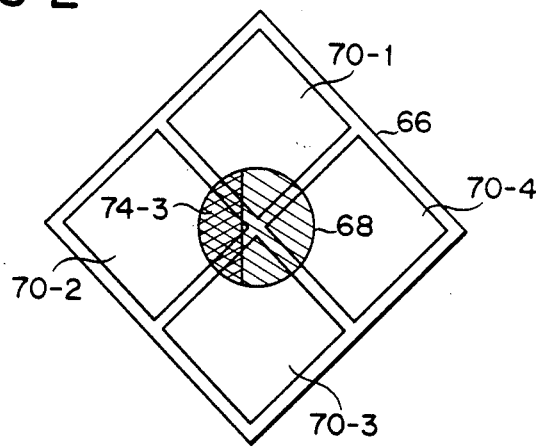

OPTICAL HEAD

BACKGROUND OF THE INVENTION

The present invention relates to an optical system for reading from and writing information on an information recording and/or reproducing medium such as an optical disk and, more particularly, to an optical head for projecting a laser beam onto an information recording and/or reproducing medium read from and write information on it.

In an optical system which reads out from or writes information on an information recording and/or reproducing medium, a laser beam is projected onto the information recording and/or reproducing medium (to be referred to as an optical disk hereinafter) through an optical head. The laser beam reflected from the optical disk is picked up by the optical head. In order to write information on the optical disk and read it out therefrom properly, the focal point of an objective lens of the optical head must be accurately placed on the light reflecting surface of the optical disk. In other words, the beam waist of the laser beam converged by the objective lens must be projected onto the optical disk. Various apparatuses have been developed to detect the focal point of the objective lens. However, none of them is satisfactory. For example, an apparatus which utilizes the difference between sizes of focused and unfocused beam spots on the optical disk is proposed wherein different patterns of the focused and unfocused beam spots are projected onto a photodetector and are detected by the photodetector to achieve proper focusing. Further, an apparatus for focusing a laser beam, which is provided with a lens system combining a convex lens and a cylindrical lens is disclosed in U.S. Pat. No. 4,079,247 of Bricot et al. In these apparatuses, if minuteness recess or projections are formed on the optical disk, a diffraction pattern is formed in the beam spot pattern on the photodetector, resulting in erroneous operation. Especially, in an optical disk which has a tracking guide to increase information recording capacity, a diffraction pattern of the tracking guide is formed in the beam spot pattern on the photodetector when the beam spot is formed on the tracking guide. As a result, the apparatus may be erroneously operated.

In the apparatus described above, the out-of-focus state of the objective lens is detected by changes in the size of the beam spot pattern on the photodetector or in the shape of the beam spot pattern. Another apparatus is proposed which detects the out-of-focus state of the objective lens by a location of a beam spot pattern formed on a photodetector. In this apparatus, laser beam for detecting the out-of-focus state of the objective lens is incident on the objective lens parallel to an optical axis of the objective lens and projected onto the optical disk therethrough, in addition to laser beams which are used for readout and writing of information. However, it has a drawback that an optical system becomes complex and the apparatus is manufactured at high cost, because the optical system having at least two optical paths for the laser beams is required. Other apparatuses are disclosed in Japanese Patent Disclosure Nos. 53-28,405, 49-31,128, and 53-10,407, respectively. In these apparatuses, laser beams for reading out and writing information are not travelled on an optical axis of an objective lens but are travelled in parallel to the axis thereof. However, in these apparatuses the laser beams cannot be sufficiently converged by the objective lens, and a sufficiently small beam spot cannot be formed on the optical disk. Further, since the laser beams pass through the outer peripheral portion of the objective lens and are projected onto the optical disk, the intensity of laser beams projected onto the optical disk is decreased by eclipse.

Further, an apparatus is dislosed in Japanese Patent Disclosure No. 53-118,103, in which a prism is arranged on an optical path of laser beams reflected by an optical disk. In this apparatus, the intensity of the laser beams may be attenuated when they pass through the prism, and unwanted diffraction may occur.

SUMMARY OF THE INVENTION

It is, therefore, an object of the present invention to provide an optical system for accurately detecting the focusing state of an objective lens.

It is another object of the present invention to provide an optical system which accurately detects the focusing state of the objective lens and which simultaneously accurately traces a tracking guide.

In order to achieve the above objects of the present invention, there is provided an optical head for focusing light beam on a light reflecting surface, comprising:

means for generating the light beam;

means for transferring the light beam;

an objective lens for converting the light beam transferred by said transferring means to convergent light beam having a beam waist, for projecting the convergent light beam onto the optical plane, and for converging divergent light beam reflected from the light reflecting surface;

a projection lens for converging the light beam from said objective lens;

means for deflecting the convergent light beam projected from said projection lens, depending on a distance between said objective lens and the light reflectively surface; and a photodetector provided with a light-receiving surface arranged on an image forming plane on which an image of a beam waist of the convergent light beam is formed by said objective and projection lenses when the convergent light beam are projected through said projection lens onto said photodetector on which a projected pattern is formed, and when said objective lens is spaced apart from the light reflecting surface at a predetermined distance and the beam waist of the convergent light beams is formed on the light reflecting surface, said light-receiving surface comprising first and second photosensitive regions, and said first and second photosensitive regions being arranged in a direction along which a projected pattern formed by the light beams on said light-receiving surface is shifted by said deflecting means.

BRIEF DESCRIPTION OF THE DRAWINGS

FIG. 2 is a perspective view showing a model of the optical system of the optical head shown in FIG. 1;

FIGS. 3A, 3B and 3C are views for explaining optical paths of the laser beams in the optical system shown in FIG. 2;

FIGS. 8A to 8E are plan views of a light-receiving surface of a photodetector having photosensitive regions whose arrangement is different from that of the light-receiving surface of the photodetector shown in FIGS. 4A to 4C and FIGS. 7A to 7C, showing the images of the laser beam spots formed on the light-receiving surface and projected patterns of the laser beams;

DETAILED DESCRIPTION OF THE PREFERRED EMBODIMENTS

Figure 1:
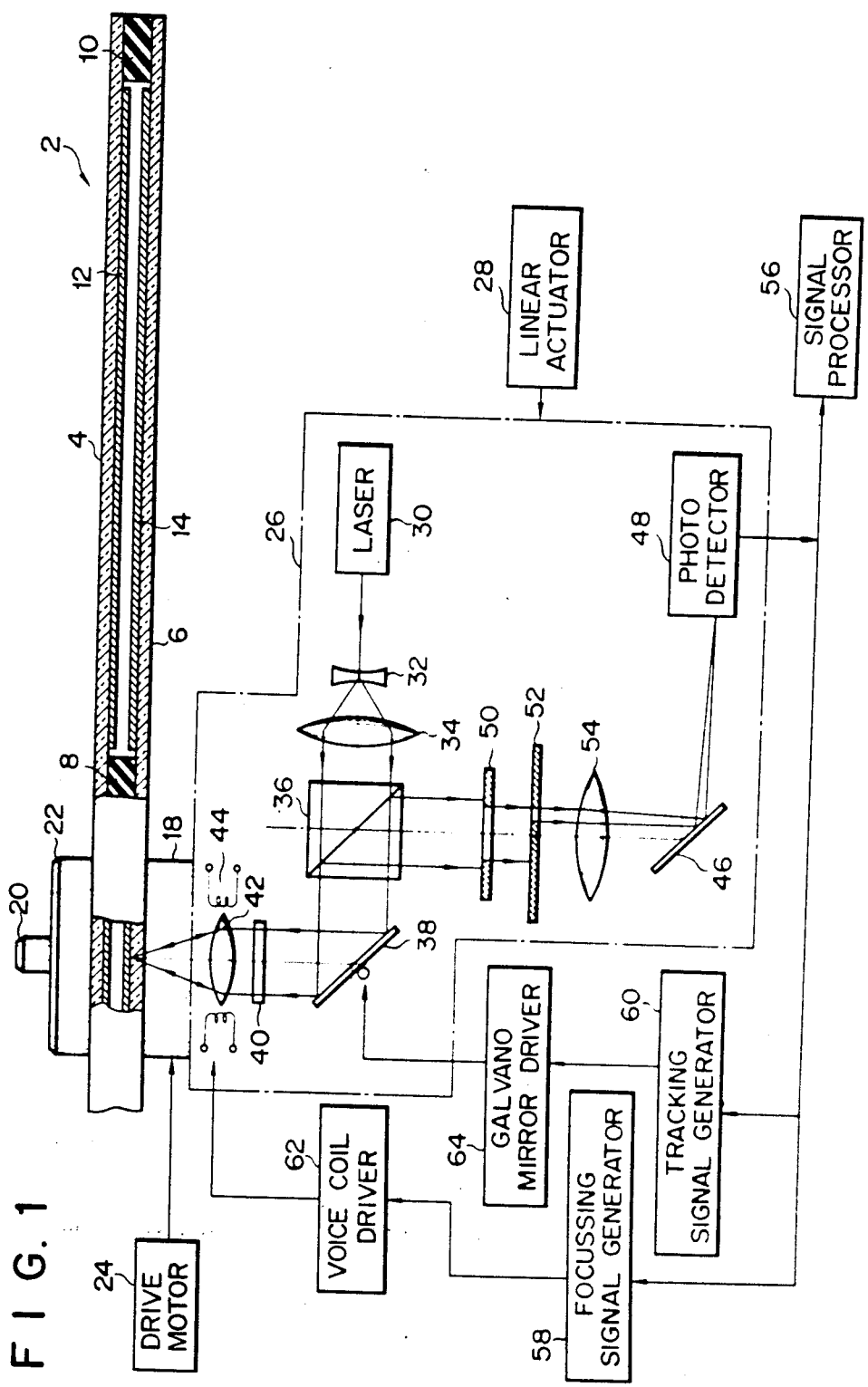
FIG. 1 is a schematic block diagram of an optical system having an optical head according to one embodiment of the present invention.

Referring to FIG. 1, information is read out from or written on an optical disk 2 as the information recording and/or reproducing medium. The optical disk 2 comprises a pair of disk-shaped transparent plates 4 and 6 which are held together through inner and outer spacers 8 and 10, as shown in FIG. 1. Light-reflecting layers 12 and 14 are deposited on inner surfaces of the transparent plates 4 and 6, respectively. Helical tracking guides 16 to be described later are formed on the light-reflecting layers 12 and 14, respectively, and information or data is recorded in the form of pits on the tracking guide 16. A through hole is formed at the center of the optical disk 2. When the optical disk 2 is placed on a turntable 18, a center spindle 20 of the turntable 18 is fitted into the through hole of the optical disk 2, such that the rotational center of the turntable 18 is aligned with that of the optical disk 2. A chucking element 22 is mounted on the spindle 20. The optical disk 2 is fixed on the turntable 18 by the chucking element 22. The turntable 18 is rotatably supported by a support member (not shown) and is driven at a constant speed by a drive motor 24.

The optical system shown in FIG. 1 has an optical head 26 to project laser beam onto the surface of the light-reflecting layer 14 of the optical disk 2 and to write information on or read it out from the optical disk 2. The optical head 26 is radially movable along the optical disk 2 by a linear actuator 28 and has a laser 30 for generating laser beams. For writing information on the optical disk 2, laser beam of modulated intensity is generated from the laser 30. For reading out information from the optical disk 2, laser beam having a predetermined intensity is generated from the laser 30. The laser beam generated from the laser 30 are diverged by a concave lens 32 and converted to parallel laser beam by a convex lens 34. The parallel laser beam is then transmitted through a beam splitter 36 and are incident on a galvano mirror 38. The laser beam is then reflected by the galvano mirror 38, are transmitted through a quarter wave plate 40, are converged by an objective lens 42, and projected onto the surface of the light-reflecting layer 14 of the optical disk 2. The objective lens 42 is movably supported by voice coils 44 along an optical axis of the objective lens 42. When the focal point of the objective lens 42 is located on the surface of the light-reflecting layer 14 of the optical disk 2 by activation of the voice coils 44, a smallest beam spot corresponding to a beam waist of the laser beam is formed on the light-reflecting layer 14. Meanwhile, for writing information on the light-reflecting layer 14, pits are formed along the tracking guide on the light-reflecting layer 14 by intensity-modulated laser beam. Information is recorded in the form of pits on the tracking guide. For reading out information from the light-reflecting layer 14, the light beam is intensity-modulated by the pits formed along the tracking guide.

Laser beams reflected from the light-reflecting layer 14 are guided to the galvano mirror 38 through the objective lens 42 and the quarter wave plate 40. The laser beam reflected by the galvano mirror 38 is incident on the beam splitter 36. It passes through the quarter wave plate 40 twice until it is transmitted through the beam splitter 36 and are directed toward the optical disk 2, where it is reflected from the optical disk 2 and returned to the beam splitter 36. Therefore, the laser beam returned to the beam splitter 36 is half-phase retarded from the laser beam directed toward the optical disk 2. As a result, the laser beam returned to the beam splitter 36 is reflected and is directed toward a mirror 46. The laser beam is then reflected by the mirror 46 and is incident on the photodetector 48. Thus, an image corresponding to the beam spot on the light-reflecting layer 14 is formed on the photodetector 48. An aperture stop 50, a light-shielding plate 52 having an aperture, a slit or a knife edge, and a projection lens 54 for projecting the laser beams onto the photodetector 48 are arranged between the beam splitter 36 and the mirror 46. The laser beam is converted to a photoelectric signal by a photodetector 48, which is then processed in a signal processor 56 and converted to digital information or data. The photoelectric signal is also supplied to a focusing signal generator 58 and to a tracking signal generator 60 which respectively generate a focusing signal and a tracking signal after processing of the received signal. The focusing signal is supplied to a voice coil driver 62 to drive the voice coils 44. Thus, the objective lens 42 is moved along the optical axis thereof, and the position of the focal point of the objective lens 42 is adjusted. On the other hand, the tracking signal is supplied to a galvano mirror driver 64 to adjust the inclination of the galvano mirror 38. As a result, the laser beam is directed toward the tracking guide and the beam spot is accurately positioned along the tracking guide on the light-reflecting layer 14.

In the optical head 2 described above, the beam waist of the laser beam converged by the objective lens 42 is positioned on the light-reflecting layer 14. The relative positional relationship between the objective lens 42, the projection lens 54 and the photodetector 48 is so determined that a smallest beam spot is formed on the light-reflecting layer 14 and its image is formed on the light-receiving surface of the photodetector 48. As shown in FIG. 1, since the parallel laser beam is generally incident on the objective lens 42, the beam waist is formed at the focal point of the objective lens 42. When the objective lens 42 is adjusted in focus state, a distance between the objective lens 42 and the light-reflecting layer 14 is determined to be a focal length of the objective lens 42, and the smallest beam spot, corresponding to the beam waist, is formed on the light-reflecting layer 14. The diverged laser beam reflected by the smallest beam spot at the focal point are converted to parallel laser beam by the objective lens 42 and are transmitted to the projection lens 54. The parallel beams are converged by the projection lens 54 and focused onto the focal point thereof. Therefore, the smallest beam spot image is formed at the focal point of the projection lens 54, and the light-receiving surface of the photodetector 48 is positioned at the focal point of the projection lens 54. Although parallel laser beam is transmitted to the objective lens 42 from the convex lens 34, the laser beam need not be parallel; slightly diverged or converged laser beam may be incident on the objective lens 42. When this occurs, the beam waist is not formed at the focal point of the objective lens 42 but is formed near the focal point. In this case, when the beam waist is positioned on the light-reflecting surface 14 and the beam waist is formed on the light-reflecting surface, the objective lens 42 is kept in the in-focus state. The image of the smallest beam spot is not formed at the focal point of the projection lens 54 but near the focal point.

The mode of operation for determining by the optical head 26 whether the objective lens 42 is in the in-focus state or out-of-focus state will be described with reference to FIGS. 2, 3A, 3B and 3C. In FIGS. 2, 3A, 3B and 3C, the optical system from the optical disk 2 to the photodetector 48 shown in FIG. 1 is simplified for illustrative convenience. If the objective lens 42 is in the in-focus state, as shown in FIGS. 2 and 3A, the light-receiving surface 66 of the photodetector 48 is positioned on an image forming plane of the beam spot determined by the position and the focal length of the objective lens 42. Therefore, an image 68 (FIG. 4A) of the smallest beam spot corresponding to the beam waist is formed on the light-receiving surface 66 (FIG. 4A) of the photodetector 48 by the laser beam component passing through the light-shielding plate 52. The light-receiving surface 66 of the photodetector 48 comprises four rectangular photosensitive regions 70-1, 70-2, 70-3 and 70-4. The center of the photosensitive surface is aligned with an optical axis 73 of the projection lens 54. If the tracking guide 71 extends on the light-reflecting layer 14 of the optical disk 2 in the direction indicated by an arrow 72, an image 74 (FIG. 4A) of the tracking guide is formed within the image 68 of the beam spot. The image 74 extends in the direction indicated by an arrow 76. The four photosensitive regions 70-1, 70-2, 70-3 and 70-4 (FIG. 4A to 4C) are arranged along the direction indicated by the arrow 76 and the direction indicated by an arrow 78 which is perpendicular to the direction indicated by the arrow 76. The light-shielding plate 52 is perpendicular to the optical axis 73 of the projection lens 54 and is positioned at Fourier transformer plane determined by the projection lens 54. The aperture of the light-shielding plate 52, defined as the light-transmitting region, is deviated from the optical axis 73. Therefore, as shown in FIG. 3B, if the objective lens 42 comes too close to the light-reflecting layer 14 of the optical disk 2, a laser beam pattern 80 (FIG. 4B) projected from the projection lens 54 is formed on the photosensitive regions 70-1 and 70-2, as shown in FIG. 4B. In other words, if the objective lens 42 comes too close to the light-reflecting layer 14, the beam waist is formed by the laser beam reflected from the light-reflecting layer 14 and a beam spot whose diameter is larger than the smallest beam spot is formed on the light-reflecting layer 14. Thus the beam waist is formed between the objective lens 42 and its focal point. Therefore, the laser beam directed from the beam waist to the objective lens 42 are converted to diverged laser beam by the objective lens 42 and are projected onto the light-shielding plate 52. Since the laser beam component passing through the light-shielding plate 52 is divergent, this component cannot be projected at the center of the light-receiving surface 66 of the photodetector 48 despite being converged by the projection lens 54. The laser beam component is deviated in the direction indicated by the arrow 76 and is projected onto the photosensitive regions 70-1 and 70-2 to form a projected pattern 80. Conversely, as shown in FIG. 3C, if the objective lens 42 is too far away from the light-reflecting layer 14 of the optical disk 2, a laser beam pattern 82 (FIG. 4C) projected through the projection lens 54 is formed in the photosensitive regions 70-3 and 70-4. In other words, if the objective lens 42 is placed too far away from the light-reflecting layer 14, the divergent laser beam from the beam waist is incident on the light-reflecting layer 14, and a beam spot whose diameter is larger than the smallest beam spot is formed. The laser beam from this beam spot to the objective lens 42 are converted to converging laser beams by the objective lens 42 and are directed toward the light-shielding plate 52. The converging laser beams passing through the light-shielding plate 52 are converged by the projection lens 54 to form a beam waist. Thereafter, the beams are diverged again and are projected onto the photosensitive regions 70-3 and 70-4.

Figure 4A:
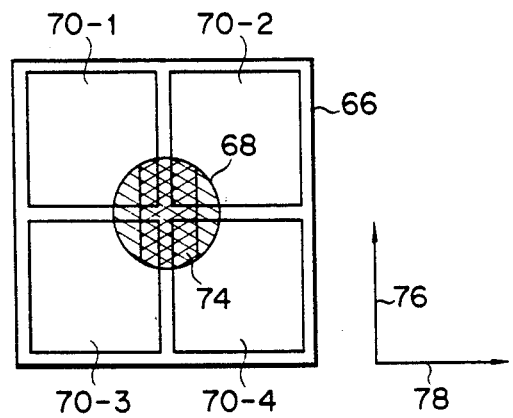
FIGS. 4A, 4B and 4C show image patterns formed on a light-receiving surface of a photodetector when the laser beams pass through the optical paths shown in FIGS. 3A, 3B and 3C, respectively.
Figure 4B:
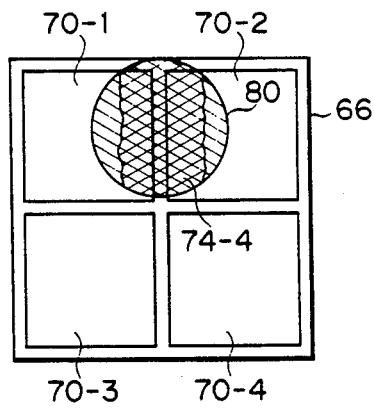
Figure 4C:
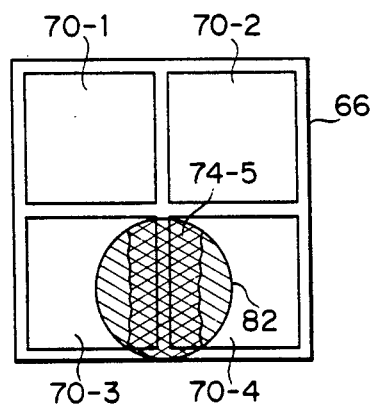
Figure 5:
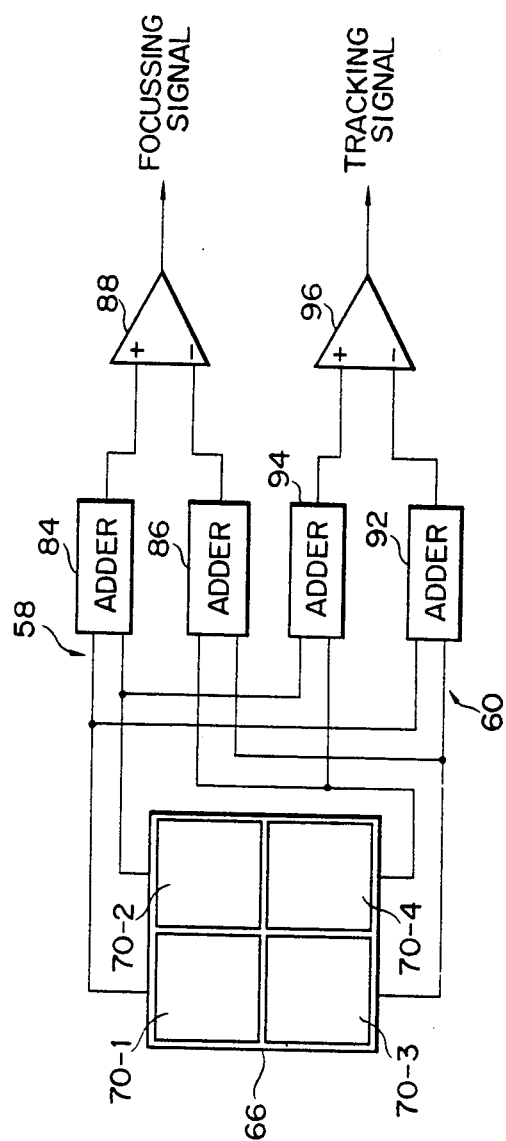
FIG. 5 is a block diagram of a focusing signal generator and a tracking signal generator which are connected to the photodetector shown in FIGS. 4A, 4B and 4C.

As is apparent from the above description, if the objective lens 42 is in the in-focus state, that area of the beam spot image which is formed in the photosensitive regions 70-1 and 70-2 will be equal to that area of the same beam spot image which is formed in the photosensitive regions 70-3 and 70-4, as shown in FIG. 4A. The photoelectric signal level generated from the photosensitive regions 70-1 and 70-2 will be equal to the photoelectric signal level generated from the photosensitive regions 70-3 and 70-4. Therefore, in a focusing signal generator 58 shown in FIG. 5, an output signal from an adder 84 connected to the photosensitive regions 70-1 and 70-2 will be at the same level as that from an adder 86 connected to the photosensitive regions 70-3 and 70-4. Thus, a comparator 88 connected to the adders 84 and 86 will not generate any focusing signal. As shown in FIG. 4B, if the projected pattern corresponding to the diffraction pattern of the beam spot is formed on the light-receiving region 66, a photoelectric signal is generated only by the photosensitive regions 70-1 and 70-2 and the voice coil driver 62 is activated. As a result, the objective lens 42 is moved in the direction away from the optical disk 2 by the voice coils 44. However, as shown in FIG. 4C, if the projected pattern corresponding to the diffraction pattern of the beam spot is formed on the light-receiving surface 66, the objective lens is moved toward the optical disk 2 in response to the focusing signal from the comparator 88.

Figure 6:
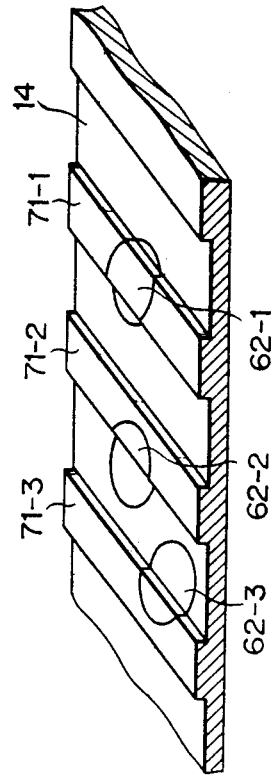
FIG. 6 is a perspective view of laser beam spots formed by the laser beams projected onto a light-reflecting surface of the optical disk.
Figure 7A:
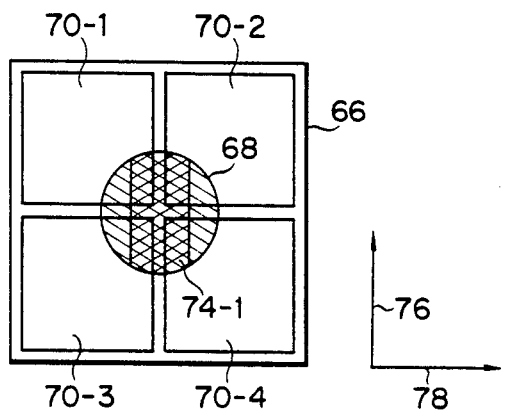
FIGS. 7A, 7B and 7C are plan views of the light-receiving surface of the photodetector, showing images of the tracking guide which are formed in the images of the laser beam spots and diffraction patterns in the tracking guide.
Figure 7B:
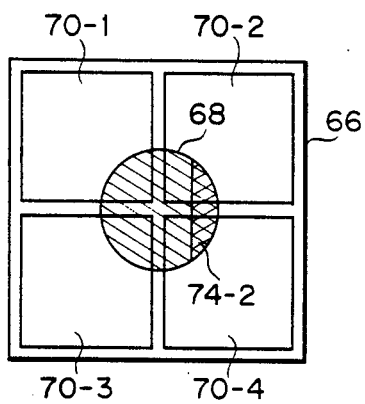
Figure 7C:
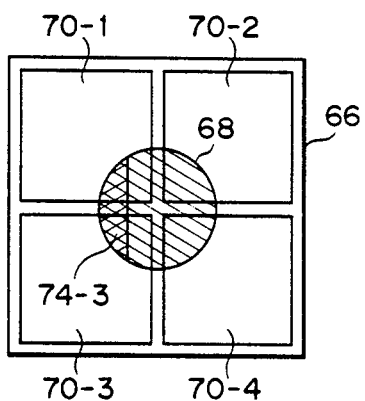

The operation for tracing the tracking guide on the light-reflecting layer 14 of the optical disk 2 with the laser beam, that is, the tracking operation, will be described with reference to FIGS. 2 and 6, and FIGS. 7A to 7C. When the galvano mirror 38 shown in FIG. 1 is inclined, the laser beams reflected from the galvano mirror 38 are also reoriented. A laser beam spot 67 (FIG. 2) formed on the light-reflecting layer is moved in the direction indicated by the arrow 90 which is perpendicular to that indicated by the arrow 72 along which the tracking guide extends. The smallest beam spot 67 has a diameter larger than a width of the adjacent tracking guide 71. As shown in FIG. 6, if a smallest beam spot 67-1 is properly projected onto a tracking guide 71-1, an image 74-1 of a tracking guide 71-1 is formed within an image 68-1 of the smallest beam spot 67-1 on the light-receiving surface 66 of the photodetector 48, as shown in FIG. 7A. However, if smallest beam spots 67-2 and 67-3 are not properly projected onto tracking guides 71-2 and 71-3 and only parts of the beam spots 67-2 and 67-3 are formed on the tracking guides 71-2 and 72-3, respectively, only parts of images 74-2 and 74-3 of the tracking guides 71-2 and 71-3 are formed in images 68-2 and 68-3 of the smallest beam spots 67-2 and 67-3, respectively, as shown in FIGS. 7B and 7C. If light rays are incident on the tracking guides 71-1 to 71-3, the light rays are diffracted at the edges of the tracking guides 71-1 to 71-3. Therefore, the images 68-1, 68-2 and 68-3 of the tracking guides 71-1, 71-2 and 71-3 are less bright than images formed between the tracking guides, resulting in the formation of dark regions. Therefore, as shown in FIG. 7A, when the smallest beam spot 67-1 is properly projected onto the tracking guide 71-1, and the image 74-1 of the tracking guide 71-1 is formed on the light-receiving surface 66, the brightness of the photosensitive regions 70-1 and 70-3 is substantially the same as that of the photosensitive regions 70-2 and 70-4. However, if the smallest beam spots 67-2 and 67-3 respectively are not properly projected onto the tracking guides 71-2 and 72-3 shown in FIGS. 7B and 7C, and if only parts of the images 74-2 and 74-3 of the tracking guides 71-2 and 71-3 are formed, the brightness of the photosensitive regions 70-1 and 70-3 is not the same as, that is, larger or smaller than that of the photosensitive regions 70-2 and 70-4. However, when the image 74-1 of the tracking guide 71-1 is properly formed on the light-receiving surface 66, as shown in FIG. 7A, an output signal from an adder 92 connected to the photosensitive regions 70-1 and 70-3 has substantially the same level as an output signal from an adder 94 connected to the photosensitive regions 70-2 and 70-4. Thus, no tracking signal is generated from a comparator 96. However, when the image 74-2 of the tracking guide 71-2 is formed on the photosensitive regions 70-2 and 70-4, as shown in FIG. 7B, an output signal level of the adder 94 is lower than that of the adder 92, so that the comparator 96 generates a tracking signal and the laser beam is shifted to separate in the opposite direction to that indicated by the arrow 90 in FIG. 2 by the galvano mirror 38, which is driven by the galvano mirror driver 64. Thus, the beam spot 67 is properly formed on the tracking guide 71. However, if the image 74-3 of the tracking guide 71-3 is formed on the photosensitive regions 70-1 and 70-3, as shown in FIG. 3C the galvano mirror driver 64 is activated in response to the tracking signal from the comparator 96 such that the laser beam is moved along the direction indicated by the arrow 90 by the galvano mirror 38.

In the optical head shown in FIG. 1, the galvano mirror 38 moves the laser beam spot in the direction perpendicular to the tracking guide 71. However, the objective lens 42 may be moved, perpendicularly to its optical axis to move the laser beam spot, instead of the galvano mirror 38. Alternatively, another mechanism may be employed to move the laser beam spot across the tracking guide 71. In FIGS. 7A to 7C, the images 74-1, 74-2 and 74-3 of the tracking guides 71-1, 71-2 and 71-3 are respectively formed on the light-receiving surface 66 when the objective lens 42 is kept in the in-focus state. However, as shown in FIGS. 4B and 4C, when the projected patterns 80 and 82 are formed, the images of the tracking guides are not formed, but diffraction patterns 74-4 and 74-6 of the tracking guide 71 are formed within the projected patterns, respectively. The diffraction patterns 74-4 and 74-6 are darker than other regions in the images of the tracking guides. Therefore, even if the objective lens 42 is not in the in-focus state, it can be detected whether or not the beam spot is properly formed on the tracking guide 71.

As is apparent from the comparison between illustrations in FIGS. 4A to 4C and FIGS. 7A to 7C, movement of the projected pattern in the direction indicated by the arrow 76 allows detection of the focusing state of the objective lens 42. Changes in brightness in the direction indicated by the arrow 78 allow tracking. Thus, focus detection and tracking are independently performed.

The aperture stop 50 is arranged between the projection lens 54 and the objective lens 42 to properly detect the focusing state of the objective lens 42 and to trace the tracking guide, as shown in FIG. 1. The beam spot 67 on the light-reflecting layer 14 is distinctly bright. If image information of the beam spot 67 is transferred by the objective lens 42 and an image corresponding to this image information is formed on the light-receiving surface 66, an image 68 of the beam spot is neither bright nor distinctive. As a result, focus detection and tracking operation may not be properly performed. However, when the aperture stop 50 is arranged so that a Fourier pattern of high order resulting from Fourier transform of the image of the beam spot by the objective lens 42 can be shielded by the aperture stop 50. As a result, the image 68 of the beam spot is distinctly formed on the light-receiving surface 66. The diameter of the aperture stop 50 is preferably about 40 to 95% of the diameter of the laser beams incident on the aperture stop 50.

Figure 8A:
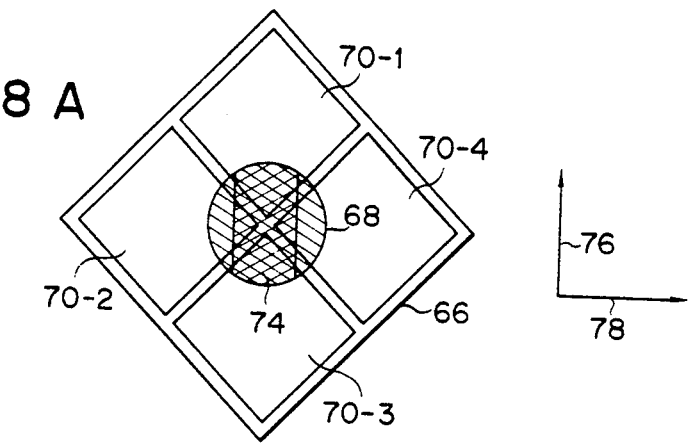
Figure 8B:
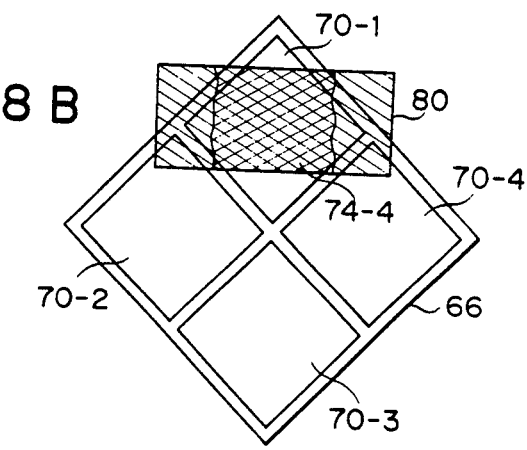
Figure 8C:
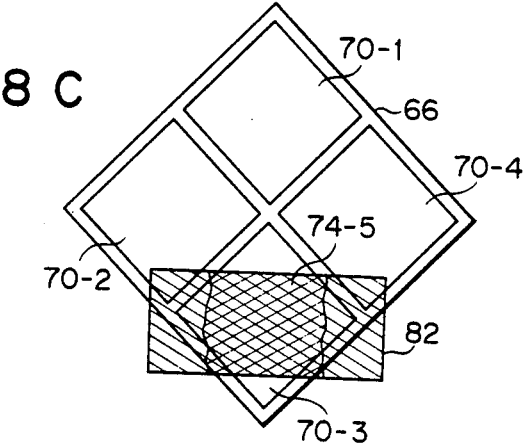
Figure 9:
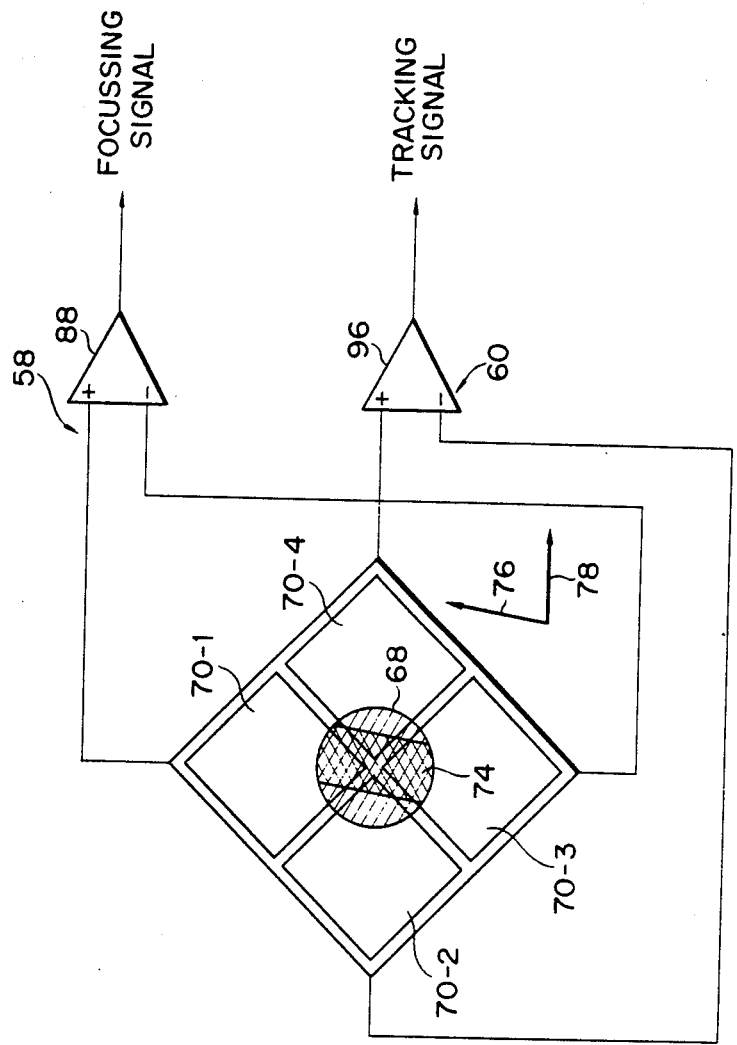
FIG. 9 is a block diagram of a focusing signal generator and a tracking signal generator which are connected to the photodetector shown in FIGS. 8A to 8E.

The photosensitive regions 70-1, 70-2, 70-3 and 70-4 of the photodetector 48 may be arranged as shown in FIG. 8A. In this arrangement, the direction indicated by the arrow 76 in which the image 74 of the tracking guide 71 is moved need not be accurately perpendicular to the direction indicated by the arrow 78 in which the diffraction patterns 74-4 and 74-6 of the tracking guide 71 or of the image 74 of the tracking guide 71 are moved. Therefore, for arranging the photodetector 48 in the optical system shown in FIG. 1, the light-receiving surface 66 need not be given a highly precise orientation with respect to the optical axis of the projection lens 54. The light-receiving surface 66 shown in FIG. 8A is arranged on the image forming plane of the smallest beam spot formed on the light-reflecting layer 14 in correspondence with the beam waist determined by the objective lens 42 and the projection lens 54. The pair of photosensitive regions 70-1 and 70-3 for detecting the focusing state of the objective lens 42 are arranged along the direction indicated by the arrow 76 along which the image 68 of the beam spot or the projected patterns 80 and 82 is moved. Similarly, the pair of photosensitive regions 70-2 and 70-4 are arranged in the direction along which the diffraction patterns 74-4 and 74-5 in the projected patterns 80 and 82 or the image 74 of the tracking guide in the image 68 of the beam spot is moved. The pair of photosensitive regions 70-1 and 70-3 are connected to a comparator 88 for generating the focusing signal, while the pair of photosensitive regions 70-2 and 70-4 are connected to a comparator 96 for generating the tracking signal. If the light-reflecting layer 14 is too close to the objective lens 42 as shown in FIG. 3B, the projected pattern 80 shown in FIG. 8B is formed on the light-receiving surface 66. However, if the light-reflecting layer 14 is too far away from the objective lens 42, as shown in FIG. 3C, the projected pattern 82 shown in FIG. 8C is formed on the light-receiving surface 66. However, if the objective lens 42 is in the in-focus state, the image 68 of the smallest beam spot is formed on the light-receiving surface 66, as shown in FIG. 8A. If the beam spot is deviated from the tracking guide 71, as shown in FIGS. 8D and 8E, the image 74 of the tracking guide 71 or the diffraction patterns 74-4 and 74-5 of the tracking guide 71 are formed predominantly on one of the photosensitive regions 70-2 and 70-4. In response to the focusing signal and the tracking signal from the comparators 88 and 96, respectively, shown in FIG. 9, the objective lens 42 is set in the in-focus state, while the laser beam spot 67 is accurately moved on the tracking guide 71. The images 68 of the beam spots and the projected patterns 74-4 and 74-5 are formed using the light-shielding plate 52 as the slit. As shown in FIGS. 8B and 8C, the projected patterns 74-4 and 74-5 which differ from those shown in FIGS. 4B and 4C are formed on the light-receiving surface 66.

In the above embodiment, in order to move the pattern of the laser beam projected on the light-receiving surface 66 in accordance with a distance between the objective lens 42 and the light-reflecting layer 14, only part of the laser beam which pass through that area deviated from the optical axis extending between the objective lens 42 and the projection lens 54 is picked up by the light-shielding plate 52. In addition to the optical system having the light-shielding plate 52 which only passes part of the laser beams, other optical systems shown in FIGS. 10, 11A, 12, 13 and 14 can change the direction of the laser beam directed from the projection lens 54 to the photodetector 48 in accordance with a distance between the objective lens 42 and the light-reflecting layer 14. In the optical systems shown in FIGS. 10 to 12, the tracking operation can be performed in the same manner as in the optical systems described above, therefore a detailed description thereof will be omitted.

Figure 10:
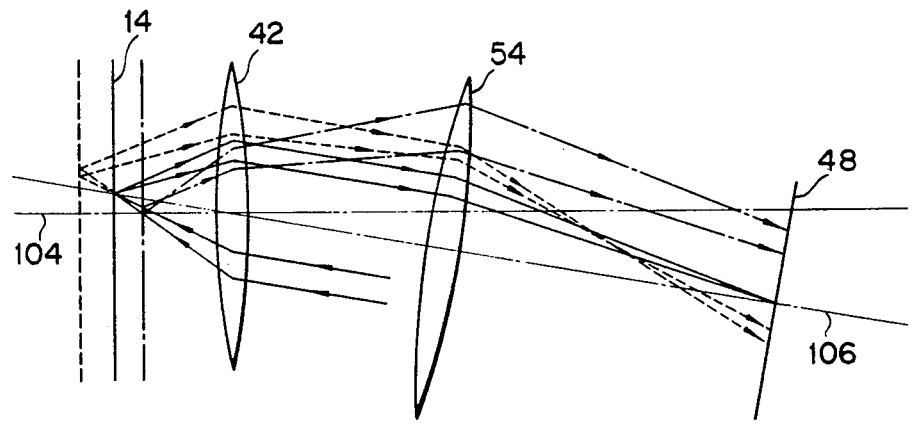
FIGS. 10, 11A, 12 and 13 show an optical head of an optical system which differs from the optical head of the optical system shown in FIGS. 1 and 2 according to another embodiment of the present invention.

In the optical system shown in FIG. 10, an objective lens 42 and the projection lens 54 are arranged so that an optical axis 104 of the objective lens 42 crosses an optical axis 106 of the projection lens 54. The surface of the light-reflecting layer 14 is perpendicular to the optical axis 104 of the objective lens 42, while the surface of the light-receiving surface 66 of the photodetector 48 is perpendicular to the optical axis 106 of the projection lens 42. The laser beam with a beam diameter corresponding to the diameter of the objective lens 42 are incident thereon along the optical axis 106 of the projection lens 54. Therefore, if the objective lens 42 is in the in-focus state, the laser beams projected through the objective lens 42 form the smallest beam spot corresponding to the beam waist on the light-reflecting layer 14. As indicated by the solid lines, the laser beam reflected by the light-reflecting layer 14 are directed toward the objective lens 42. The laser beam transmitted through the objective lens 42 is converted to parallel laser beam and converged by the projection lens 54. The converted laser beam is then projected on the light-receiving surface 66 positioned on the image forming plane determined by the objective and projection lenses 42 and 54. Thus, the smallest beam spot image is formed on the light-receiving surface 66. However, if the objective lens 42 is in the out-of-focus state, the laser beam is guided along the optical path indicated by the broken lines and the alternate long and short dashed lines, projected through the projection lens 54 and directed toward the light-receiving surface 66. Therefore, the projected pattern shown in FIGS. 4B and 4C is formed on the light-receiving surface 66.

Figure 11A:
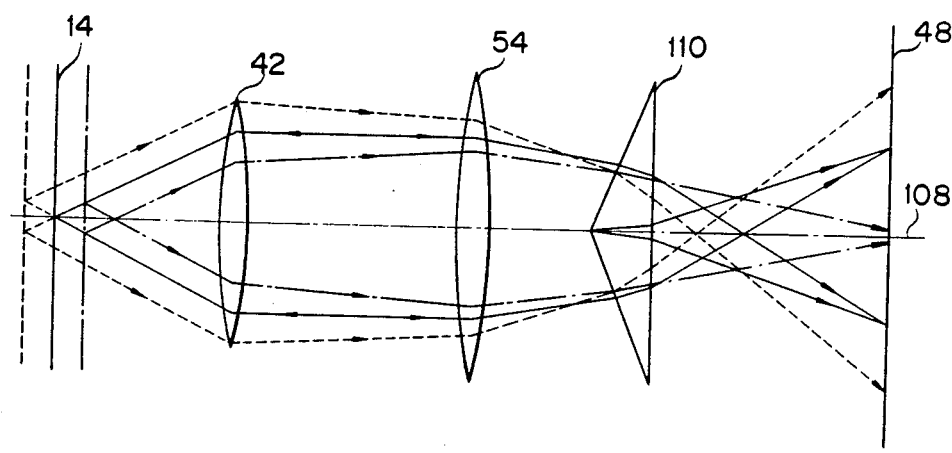
Figure 11B:
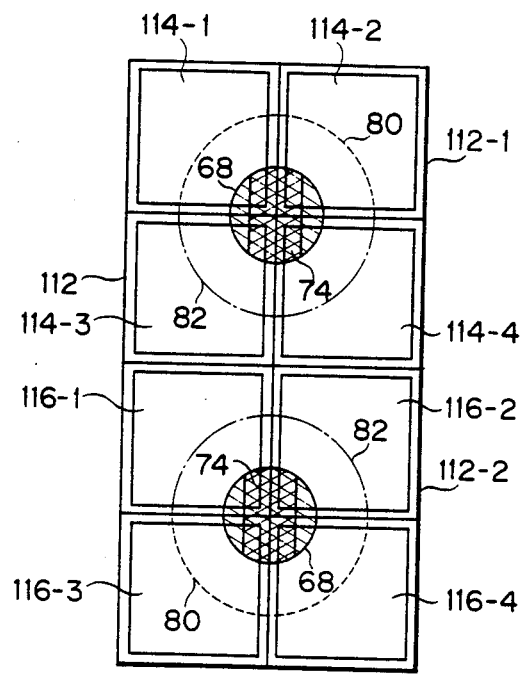
FIG. 11B is a plan view of the light-receiving surface of the photodetector according to the optical system shown in FIG. 11A.

In the optical system shown in FIG. 11A, the objective lens 42, the projection lens 54 and a Fresnel biprism 110 are arranged along a common optical axis 108. The light-reflecting layer 14 and a light-receiving surface 112 of the photodetector 48 are perpendicular to the optical axis 108. The light-receiving surface 112 is positioned on the image forming plane determined by the objective lens 42 and the projection lens 54. As shown in FIG. 11B, the light-receiving surface 112 has two segment surfaces 112-1 and 112-2. The segment surfaces 112-1 and 112-2 have photosensitive regions 114-1, 114-2, 114-3 and 114-4 and photosensitive regions 116-1, 116-2, 116-3 and 116-4, respectively, in the same manner as the light-receiving surface 66 shown in FIG. 4A. In the optical system shown in FIG. 11A, if the objective lens 42 is in the in-focus state, the parallel laser beam is converged by the projection lens 54 as indicated by the solid lines, and are split by the biprism 110. The split laser beams are projected on the light-receiving surface 112. Therefore, as shown in FIG. 11B, the smallest beam spot images 68 are formed on the segment surfaces 112-1 and 112-2 of the light-receiving surface 66, respectively. However, if the objective lens 42 is in the out-of-focus state, the converged laser beam indicated by the broken lines or diverged laser beam indicated by the alternate long and short dashed lines is incident on the projection lens 54. The converged laser beam is converged by the projection lens 54, so that the beam waist thereof is formed between the biprism 110 and the light-receiving surface 112. As a result, a pair of projected patterns 80 which are spaced apart are formed on the light-receiving surface 112, as indicated by the broken lines. On the other hand, the diverged laser beam is converted to converged laser beam by the projection lens 54. In this case, the beam waist is not formed between the biprism 110 and the light receiving surface 112 and the laser beams are projected on the light-receiving surface 112. Therefore, a pair of projected patterns 82 which are close together as indicated by the alternate long and short dashed lines are formed on the light-receiving surface 112, as shown in FIG. 11B.

Figure 12:
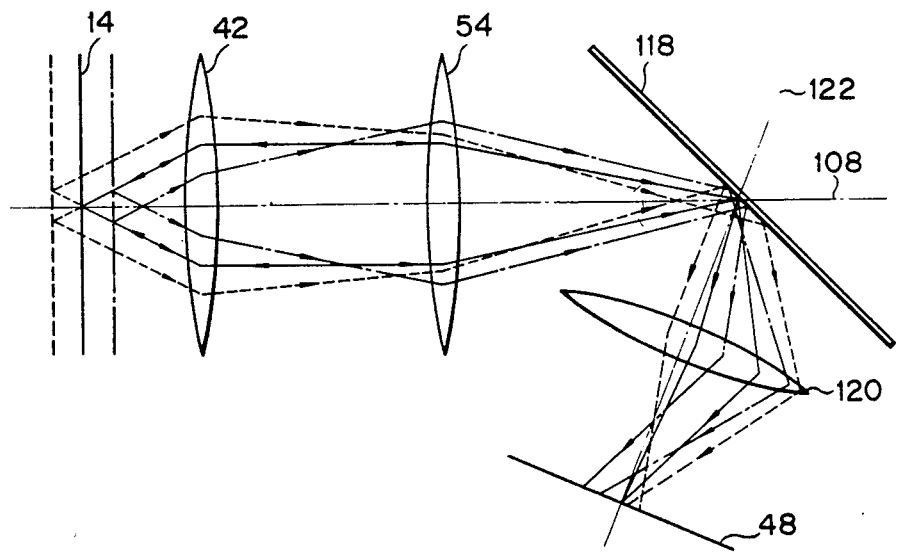

In the optical system shown in FIG. 12, a mirror 118 is arranged on the common optical axis 108 of the objective and projection lenses 42 and 54. The covergent lens 120 having an optical axis 122 is arranged between the mirror 118 and the light receiving surface 66 of the photodetector 48. The mirror 118 is arranged on the image forming point determined by the objective lens 44 and the projection lens 54 and the light receiving surface of the photodetector arranged on the optical axis 122. If the objective lens 42 is in the in-focus state, the laser beam passes through the optical path indicated by the solid lines and the smallest beam spot image is formed on the mirror 118. The smallest beam spot image on the mirror is transferred by the convergent lens 120 to the light-receiving surface 66. However, if the objective lens 42 is in the out-of-focus state, converged laser beam indicated by the broken lines or diverged laser beam indicated by the alternate long and short dashed lines is incident on the projection lens 54 in the same manner as in the previous embodiments. These laser beams are converged by the projection lens 54 and the laser beams reflected from the mirror 118 is directed to the convergent lens 120. However, when these laser beams reflected from the mirror 118 are converged by the convergent lens 120, projection patterns shown in FIGS. 4B and 4C are formed on the light-receiving surface 66 due to different travelling directions, respectively.

Figure 13:
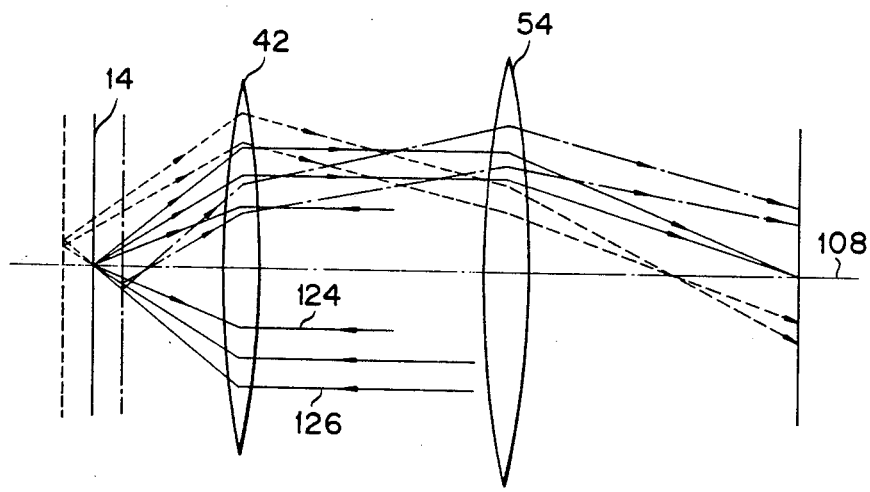
Figure 14:
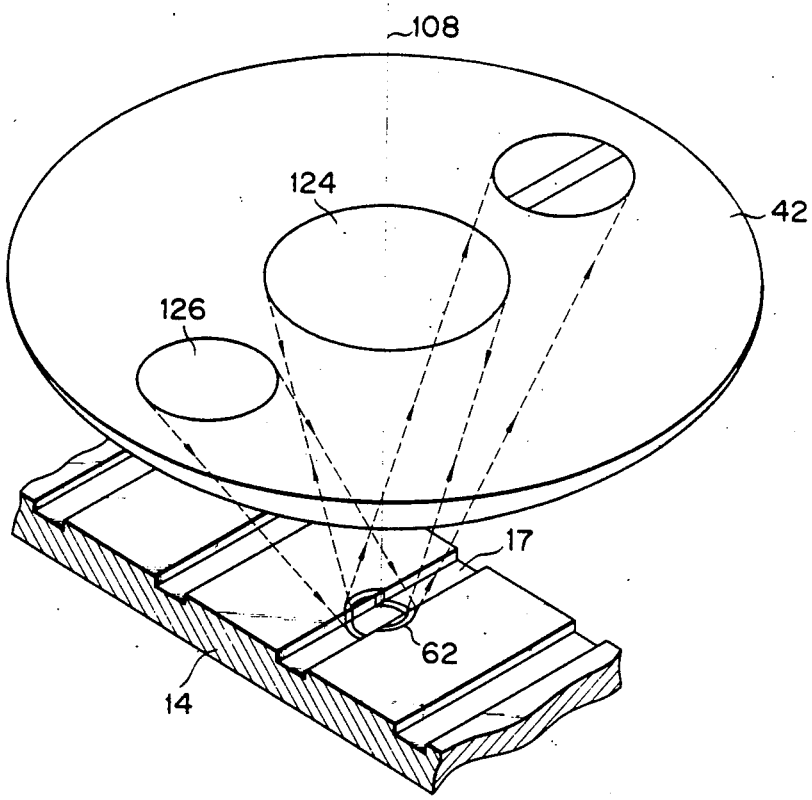
FIG. 14 is a perspective view of laser beam paths and laser beam spots in the optical system shown in FIG. 13.

In the optical system shown in FIGS. 13 and 14, the objective and projection lenses 42 and 54 are arranged on the common optical axis 108. In the optical system shown in FIGS. 13 and 14, first and second laser beams 124, 126 are incident on the objective lens 42. The first laser beam 124 for recording and reproducing the information is travelled along the optical axis 108 and the second laser beam 126 for focusing and tracking the laser beam 124 is travelled along a optical path 108 which is remote from, and is parallel with the optical axis 108. On the light reflecting layer 14, two beam spots are formed by the two beams as shown in FIG. 14. When the objective lens 42 is in the in-focus-state, the smallest beam spots corresponding to the beam waists of the two laser beams 124, 126 are formed on the light reflecting layer 14. Therefore, the first and second laser beams 124, 126 form the images of the smallest beam spots on the center region of the light receiving surface 66 of the photodetector 48, only the first laser beam being indicated by the solid line. When the objective lens 42 is in the out-of-focus state, the beam spots larger than the smallest beam spots are formed on the light receiving surface 66. The first laser beam 124 forms the projected pattern on the center region of the light receiving surface 66, but the second laser beam 126 passing through the optical paths indicated by the broken line or the alternate long and short dashed line is deviated on the light receiving surface 66 and forms the projected pattern on the upper or lower regions of the light receiving surface 66. Therefore, the optical system shown in FIGS. 13 and 14 can detect the focusing state of the objective lens. In FIG. 14, the tracking guide is formed as a recess on the light reflecting layer instead of the projected tracking guide.

In the embodiments shown in FIGS. 10, 11, 12, 13 and 14 the laser beams travelling toward the objective lens 42 are parallel laser beams. However, converged or diverged laser beams may be used to detect the focusing state of the objective lens in the same manner as in the optical system indicated in FIG. 1.

Explanation has been made in connection with the embodiment in which the optical disk is equipped with a tracking guide and the tracking guide image is formed on the light receiving surface of the photodetector. In this connection it is to be noted that, even if the optical disk is not equipped with the tracking guide, an image corresponding to the tracking guide image is formed on the light receiving surface. That is, where the optical disk is rotated at high speeds, information pits formed on the light reflecting layer of the optical disk describes a pattern as a rotation locus which is similar to that of the tracking guide, permitting a corresponding image to be formed on the light receiving surface. It is to be noted in this connection that in this specification the locus pattern corresponding to the information pits is treated as the tracking guide.

According to this invention, during the in-focus state of the objective lens the light reflecting layer of the optical disk and light receiving surface of the photodetector are located at the objective point and focal point as determined by the objective lens and projective lens, respectively, permitting an image on a minimum beam spot corresponding to a beam waist to be formed on the light receiving surface. Even if the light reflecting layer of the optical disk is inclined and thus ceases to be in an orthogonal relation to the optical axis of an objective lens, judgement can be made as to whether or not the objective lens is exactly in the in-focus state without causing the beam spot image to be displaced on the light receiving surface. Even when dirt or defect is present on the laser beam path of the optical system, a beam spot image is formed on the image forming point during the in-focus state of the objective lens without involving any displacement of the beam spot image by the dirt or defect. Where the light shielding plate is arranged in a Fourier transform plane as defined by the projection lens, no pattern on the light ray transmitting area on the light shielding plate emerges on the light receiving area during the in-focus state of the objective lens, permitting the in-focus state to be accurately detected.

What is claimed is:

1. An optical head for focusing a light beam on a light reflecting layer on which a tracking guide is formed, comprising:

means for generating the light beam;

means for directing the generated light beam;

an objective lens between said directing means and said light reflecting layer for converging the directed light beam into a convergent light beam having a beam waist, for projecting the convergent light beam onto the light reflecting layer, and for converging a divergent light beam reflected by the light reflecting layer, a beam spot corresponding to the beam waist of the converged light beam being formed on the light reflecting layer when the objective lens is in a just in-focusing state, and a beam spot of a larger size than that of the beam waist being formed on the light reflecting layer when the objective is in defocusing state;

means for converting the reflected light beam transmitted from the objective lens into a component beam which is deflected in accordance with the distance between said objective lens and the light reflecting layer; and a photodetector with a light receiving surface substantially located on an image forming plane on which an image of the beam spot corresponding to the beam waist is formed by said objective lens when the objective lens is in the just in-focusing state, the light receiving surface including at least first and second photosensitive regions which are arranged in a direction along which a projected pattern formed by the component beam is shifted by said converting means.

2. An optical head according to claim 1, wherein said light beam generating means generates laser beams.

3. An optical head according to claim 1, wherein said objective lens has an optical axis perpendicular to the light reflecting surface.

4. An optical head according to claim 1, wherein said directing means converts the light beams to parallel light beams and directs the parallel light beam to said objective lens.

5. An optical head according to claim 1, wherein the light reflecting layer comprises a light-reflecting layer of an optical disk.

6. An optical head according to claim 1, wherein a tracking guide is formed on said light-reflecting layer toward which convergent light beams are projected from said objective lens, and an image of the tracking guide or the information pattern is formed on the light receiving surface when the beam waist of the convergent light beam is projected onto the light reflecting layer.

7. An optical head according to claim 6, wherein said converting means includes means for moving laser beams projected through said objective lens in a direction to cross the tracking guide, so that the image of the tracking guide within the beam waist image formed on the light-receiving surface is displaced in a specific direction when the beam waist of the convergent light beam is projected onto the light reflecting layer and the laser beams are moved by said moving means, the specific direction being different from a direction along which the beam pattern projected onto the light reflecting layer is moved.

8. An optical head according to claim 7, wherein the direction along which the image of the tracking guide or the information pattern is moved is substantially perpendicular to the direction along which the beam projected pattern is moved.

9. An optical head according to claim 7, wherein said light-receiving surface further includes third and fourth photosensitive regions, said third and fourth photosensitive regions being arranged in the direction along which the image of the tracking guide is moved.

10. An optical head according to claim 9, in which the four photosensitive regions are arranged on the respective diagonal lines and a track focusing signal produced by taking a difference between sum signals of the mutually adjacent regions.

11. An optical head according to claim 9, in which the four photosensitive regions are arranged on the respective diagonal line, and a track focusing signal produced by taking a difference between signals produced from the photosensitive regions on the diagonal lines.

12. An optical head as in claim 1 further including a projection lens for further converting the reflected light beams from said objective lens.

13. An optical head according to claim 12, wherein said objective and projection lenses have a common axis, a light-shielding plate being arranged on the common axis to transmit only part of the light beams passing through an area which is spaced apart from the common axis.

14. An optical head according to claim 13, wherein said light-shielding plate has an aperture.

15. An optical head according to claim 13, wherein said light-shielding plate has a slit.

16. An optical head according to claim 13, wherein said light-shielding plate has a knife edge.

17. An optical head according to claim 12, wherein an aperture stop is arranged between said objective lens and said projection lens, so that a Fourier pattern component of high order included in the light beams which is transferred from said objective lens to said projection lens is eliminated.

* * * * *